United States Patent [19]

Greenbaum

[11] 4,313,279

[45] Feb. 2, 1982

[54] AGRICULTURAL SYSTEM WITH ARTICULATED MEMBERS

[76] Inventor: George Greenbaum, 790 Boylston St., Boston, Mass. 02199

[21] Appl. No.: 118,547

[22] Filed: Feb. 4, 1980

Related U.S. Application Data

[63] Continuation-in-part of Ser. No. 101,499, Dec. 10, 1979.

[51] Int. Cl.³ .............................................. A01G 9/00
[52] U.S. Cl. .............................................. 47/29; 47/17; 52/73; 135/4 R
[58] Field of Search ....................................... 47/20–22, 47/26–28 R, 29, 31, 17; 135/DIG. 3, 3 R, 4 R, 5 R, 7.1 R; 52/63, 73, 109, 13, 71

[56] References Cited

U.S. PATENT DOCUMENTS

| | | | |
|---|---|---|---|
| 133,516 | 12/1872 | Brown | 52/73 |
| 1,076,310 | 10/1913 | Pennington | 135/DIG. 3 |
| 1,712,836 | 5/1929 | Mills | 135/4 R |
| 3,868,961 | 3/1975 | Sternis | 135/4 R |
| 4,012,867 | 3/1977 | Lainchbury et al. | 47/29 |

*Primary Examiner*—Robert E. Bagwill
*Attorney, Agent, or Firm*—Thompson, Birch, Gauthier & Samuels

[57] ABSTRACT

An agricultural system with a controlled atmosphere. A plurality of articulated structural members with an arched configuration are secured in aligned, spaced-apart relationship by horizontal members to define a skeletal structure. Flexible sheet material is secured to the structure to define a controlled atmosphere. The system is adjustable between a fully enclosed mode and a fully open mode.

3 Claims, 4 Drawing Figures

ND RELATED APPLICATION

AGRICULTURAL SYSTEM WITH ARTICULATED MEMBERS

CROSS REFERENCE TO RELATED APPLICATION

This application is a continuation-in-part of application Ser. No. 101,499 filed Dec. 10, 1979 entitled *Agricultural System with Controlled Atmosphere.*

BACKGROUND OF THE INVENTION

The invention relates to composite agricultural systems, and more particularly, to certain structures for defining an environment about plants to control carbon levels, enhance light energy and transpiration.

Several types of structures have been disclosed, which, in one form or another, enclose plants. See for example U.S. Pat. Nos. 3,896,586 —a cover to protect a plant during growth; 4,034,508 —a rigid plastic enclosure; 3,872,621 and 4,135,331 —seedling enclosures; 4,148,154 and 4,412,325 —integral rigid enclosures; and 4,012,867 —an enclosure including a conister of carbon dioxide.

All of these disclosed structures are rather limited in application primarily because of the fact that they are customized for a specific application. There is no flexibility in their design.

With an enclosed unit substantially all factors affecting plant growth can be controlled. It has been well documented that the use of supplementary carbon dioxide promote plant growth. Also, the proper utilization of light energy may enhance plant growth. However, to date a simple structure to combine these features has not been provided.

BRIEF SUMMARY OF THE INVENTION

In my pending application Ser. No. 101,499 complete control of the factors affecting the aerial portion of a plant is provided. A structure, inexpensive and easy to assemble, defines an environment about the leafy portion of the plant. An enriched carbon dioxide atmosphere is created and maintained, light energy is directed onto the plant from all sides, if desired, and in some embodiments, a ventilation system controls the plants' transpiration. The present invention includes all these advantages while providing a structure of increased flexibility.

Broadly, my invention comprises forming a skeletal structure from a plurality of adjustable articulated support members and enclosing the structure with a flexible film to define a controlled atmosphere about the plants. Means are optionally provided to introduce carbon dioxide into the atmosphere and to vent the system and to collect and direct light energy within the controlled atmosphere.

My invention in one embodiment includes at least two vertical supports and a plurality of horizontal supports. The vertical supports include articulated arches secured to the top of the vertical support. The arches define a substantially V-shaped recess. Conduit means to support sheet material and carry carbon dioxide and/or water may be received in these V-shaped recesses. Horizontal supports are joined to the arches to define a skeletal structure. Flexible sheet material is draped over the vertical and horizontal supports to form the basic unit.

The arches are articulated such that they extend from the vertical support downwardly to the ground forming a fully enclosed mode. They may be collapsed, such as in accordian fashion, to form a fully open mode.

With my present invention in the enclosed mode, the plant leaves are exposed to a carbon dioxide enriched atmosphere, there is a reduction of moisture loss to the ambient, maximum utilization of foliage spray fertilization is provided, insect and fungal infection from adjacent plants is minimized, and maximum utilization of light energy is achieved.

The source of carbon dioxide typically present in the atmosphere at about 300 ppm is increased to between about 900–1100 ppm. The carbon dioxide may be generated by carbon dioxide pellets (dry ice), aerosol containers, decomposition or organic matter and evolution by means of acid hydrolysis of suitable dry chemical compounds.

For the utilization of light energy, collection and reflection, light reflecting surfaces are fixed in various positions, whereby the plant leaves are essentially within a sphere of light.

DESCRIPTION OF THE PREFERRED EMBODIMENT

The particular vertical and horizontal supports described are shaped and formed from metal or plastic rods or flat stock and form a skeletal structure over which is draped a flexible sheet material.

The flexible material which is used is preferably plastic film and generally, any one of the following transparent types: polyethylene, polypropylene, polyester, polyvinyl and/or polycarbonate. This covering material may be used to envelop the structures in one continuous seamless web, or may be sub-divided into predetermined areas to furnish ventilation and allow inclusion of light reflecting surfaces. The typical thickness of such material is between about 0.5 to 6.0 mills depending upon its ability to prevent diffusion of carbon dioxide, to admit light and its resistance to ultra-violet radiation.

The vertical supports of the described system may comprise two sections telescopically joined to adjust the height of the system.

Figure 1:
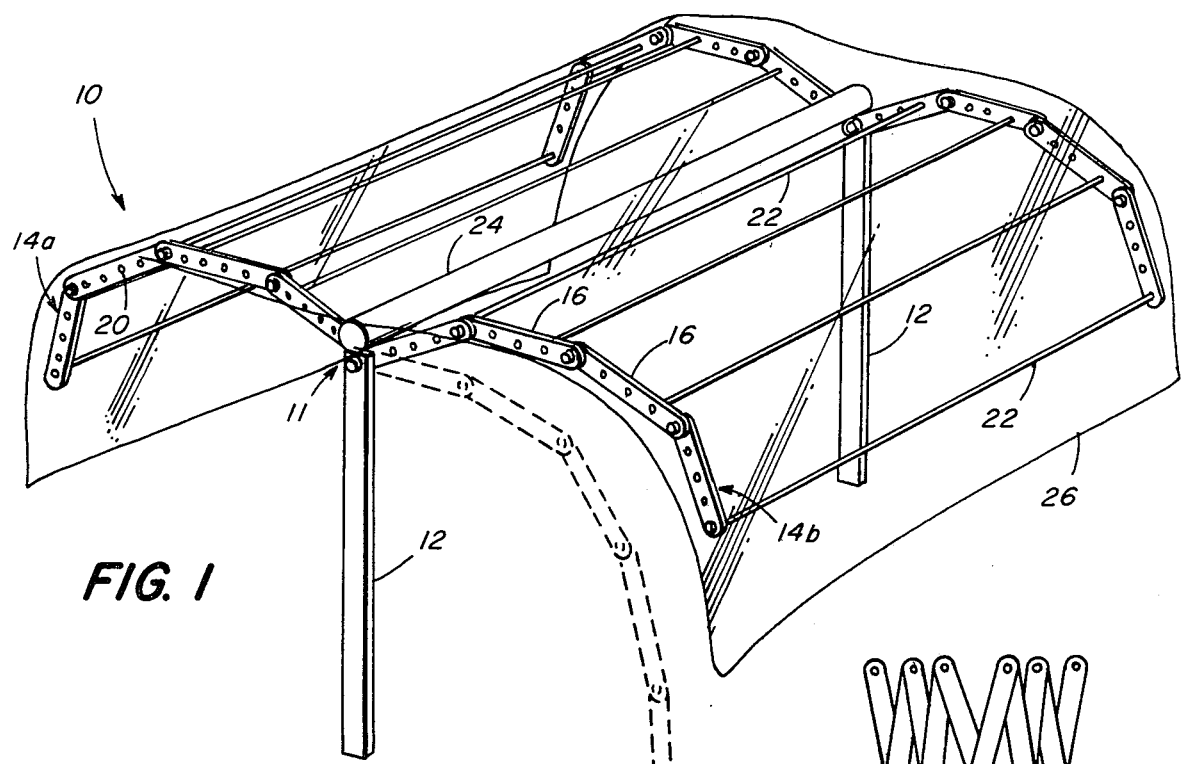
FIG. 1 is a perspective illustration of the preferred embodiment of the invention.

The preferred embodiment of the invention is illustrated in FIG. 1 at 10 and includes support members 11 which comprise vertical support rods 12 in spaced-apart parallel relationship, each vertical support rod having secured to the top portion thereof articulated arches 14*a* and 14*b*. The supports 12 and arches 14 being identical, only one set will be described in detail.

Figure 2:
FIG. 2 is a front view of bolted segments of an arch.

The lower end of the rod 12 is secured to the ground in any suitable manner, either by being received in the ground or supported as described in the parent application. The arches 14 comprise a plurality of segments 16 adapted for relative movement one to the other at joints 18 and the segments 16 include apertures 20. Preferably, the segmented arches are formed from flat strips, the ends of which are drilled to form a pivot joint which allows adjustment between joined segments to any angle and any desired degree of resistance to movement. For example, the ends of the segments may be bolted as shown in FIG. 2.

Where the arches 14a and 14b are secured to the vertical support 12, they define a V-shaped recess which is adapted to receive a conduit 24 which extends from one member 11 to the other. Conduit 24 is used to provide for the generation of carbon dioxide as described in the parent application.

Horizontal rods 22 are secured in the apertures 20 of the opposed arches completing the skeletal structure. Flexible sheet material 26 is draped over the skeletal structure and may be secured in any suitable manner.

The sheet material 26 may be secured in the manner as described in the parent application wherein a plurality of recesses would be formed in the segments and the horizontal support rods would be received in the recesses with the sheet material carried between the recesses and the horizontal support rod.

As shown in FIG. 1 in solid lines, the arches are adjusted to a semi-enclosed mode. As shown in dotted lines, the arches are adjusted to a fully enclosed mode.

Figure 3:
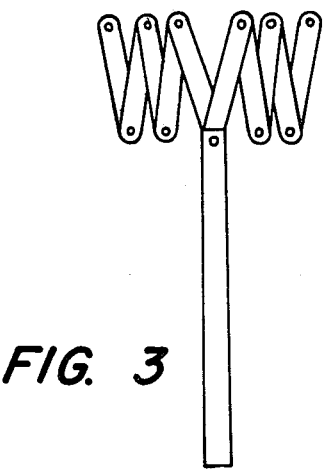
FIG. 3 is a front view of FIG. 1.

In FIG. 3, a front view illustrates the segments 16 of the arches 14 collapsed in accordion fashion to form a fully open mode. Aternatively, for the support rods 22, cord or wire may be strung therethrough to support the sheet material. Typically, the sheet material 26 is loosely draped over the structure to allow adequate film to accomodate the varying configurations.

As shown in FIGS. 1 and 3 the sheet material and skeletal structure forms a plastic canopy which may be articulated in any one of an infinite number of modes from fully enclosed to semi-enclosed to completely open.

The embodiment of FIG. 3 illustrating the completely open mode is particularly suitable when the crops are to be harvested.

The basic unit of the system has been described and it may be extended longitudinally as desired. At the terminus, when used in the fully enclosed mode, sufficient sheet material 26 is provided to enclose the entire structure as described in the parent application. Also, one system may be used within another to form a double-walled or insulated unit.

Figure 4:
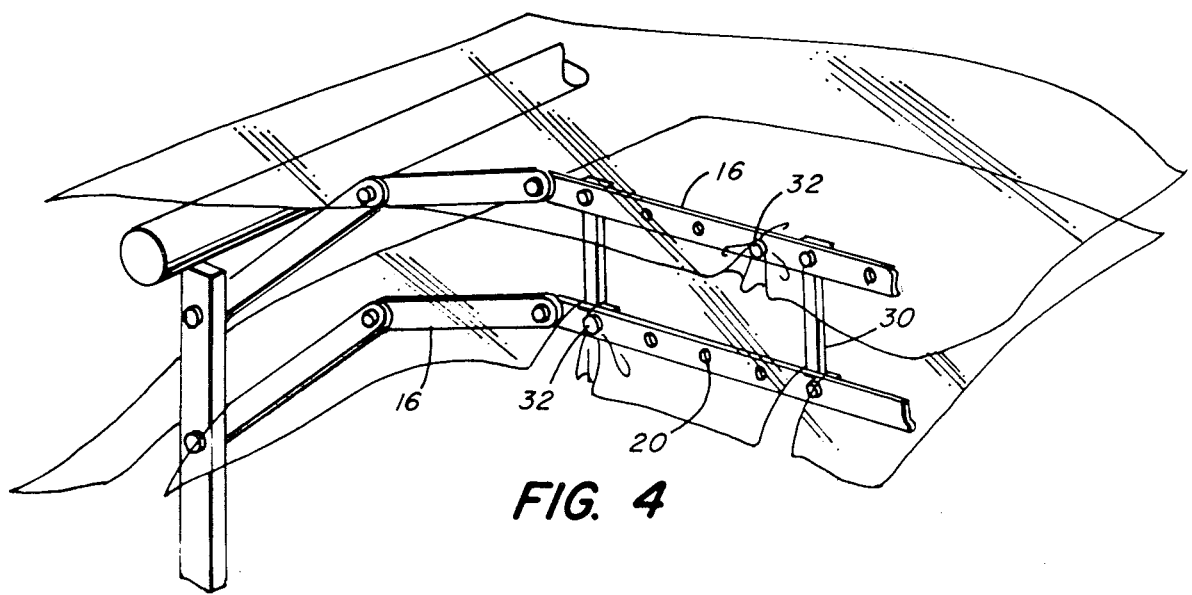
FIG. 4 is a perspective illustration of an insulated embodiment of the invention.

A section of a double-walled section is shown in FIG. 4. This is the system of FIG. 1 with an air space defined between two layers of sheet material. In FIG. 4, two segments 16 are secured in spaced-apart parallel relationship by U-shaped struts 30, the ends of which are frictionally engaged in a movable manner to the apertures 20 in the segments 16. The struts 30 are placed to achieve maximum stability. The sheet material may be secured to the segments by soft rubber buttons 32 or the like pressed into the apertures.

Having described my invention, what I now claim is:

1. An agricultural system which comprises:
   (a) at least two longitudinal vertical supports in spaced-apart parallel relationship;
   (b) two articulated arches secured to each support at the upper portion thereof, the arches defining a V-shaped recess where joined to the vertical support, each of the arches formed of a plurality of uniform apertured segments pinned one to the other, including a first segment and a last segment, the first segment of each arch pinned to the vertical support, each arch adapted to extend from a first open position where the last segment engages the ground, to a closed position where the last segment is adjacent to the upper portion of the vertical support;
   (c) a plurality of longitudinal rod-like horizontal supports in parallel relationship perpendicularly received in the apertures of the segments; the vertical supports, the arches and the horizontal supports forming a skeletal structure; and
   (d) flexible sheet material secured to the structure on the outer surface thereof to define an enclosed atmosphere.

2. The system of claim 1 wherein the articulated arches secured to each vertical support comprise first inner articulated arches and which system includes:
   second outer articulated arches identical to the inner arches joined to the vertical supports and spaced apart from the first articulated arches;
   struts secured to the first and second articulated arches to maintain the arches in spaced-apart relationship;
   a plurality of longitudinal rod-like horizontal supports in parallel relationship perpendicularly received in the apertures of the segments of the outer arches; and
   flexible sheet material secured to the outer surfaces of the outer arches and horizontal supports.

3. The system of claim 1 wherein means to distribute $CO_2$ is supported by the V-shaped recesses of the spaced-apart vertical arches.

* * * * *